United States Patent [19]

Nassef et al.

[11] 4,219,415
[45] Aug. 26, 1980

[54] METHOD AND APPARATUS FOR DISPOSAL OF ORGANIC WASTES

[76] Inventors: N. A. Nassef, 11562 Clear Creek Dr., Pensacola, Fla. 32504; Leale E. Streebin, 2301 Morgan Dr., Norman, Okla. 73069

[21] Appl. No.: 932,347

[22] Filed: Aug. 9, 1978

[51] Int. Cl.² .......................... B01D 23/14; C02C 1/22
[52] U.S. Cl. ........................................ 210/32; 210/40; 210/71; 210/80; 210/184; 210/271
[58] Field of Search ....................... 210/32, 39, 40, 71, 210/80, 152, 179, 180, 184, 269, 271, 272; 4/131, 10; 110/9 R, 9 B

[56] References Cited

U.S. PATENT DOCUMENTS

| | | | |
|---|---|---|---|
| 1,830,515 | 11/1931 | Kurie, Jr. et al. | 210/272 X |
| 2,700,775 | 1/1955 | Martin | 4/131 |
| 3,431,563 | 3/1969 | Rascov | 4/1 |
| 3,480,542 | 11/1969 | Bucksteeg et al. | 210/71 X |
| 3,486,621 | 12/1969 | Hirs | 210/152 X |
| 3,568,838 | 3/1971 | Applegren | 210/179 X |
| 3,589,276 | 6/1971 | Swallert | 100/90 |
| 3,608,273 | 9/1971 | Fabuss et al. | 55/74 |
| 3,700,565 | 10/1972 | Cornish | 210/152 X |
| 3,762,554 | 10/1973 | Wallover | 210/179 |
| 3,962,044 | 6/1976 | Mckenzie | 4/10 X |

*Primary Examiner*—John Adee
*Attorney, Agent, or Firm*—William R. Laney

[57] ABSTRACT

A method and apparatus for disposing of aqueous organic wastes by filtration and microwave irradiation. The aqueous organic waste is placed on a moving activated carbon filter bed, and during the bed movement, the liquid in the waste is substantially separated from the solid organic matter. In the course of separation, and during movement of bed, both the liquid and the organic solid matter are irradiated with microwaves and are thereby stabilized and sterilized. A portion of the sterilized organic solid residue is stored, and is subsequently converted to activated carbon to be used in the filter bed.

The apparatus of the invention includes a rotary porous disc supported over a bed of activated carbon which is rotatable with the disc. A source of microwaves is positioned over one side of the disc for irradiating material on the disc and the activated carbon in the bed. A liquid collection device is positioned under the activated carbon bed for catching and storing liquid which has drained through the porous disc in the activated carbon bed after the liquid has been microwave irradiated. A solids removal device is positioned over the disc for removing sterilized solids therefrom and transferring them to a pyrolysis/incineration unit. Means is provided for irradiating the sterilized organic solid residue in the incineration unit to convert it to activated carbon, or to effect a reduction thereof to gases and a small ash residue.

23 Claims, 5 Drawing Figures

METHOD AND APPARATUS FOR DISPOSAL OF ORGANIC WASTES

BACKGROUND OF THE INVENTION

1. Field of the Invention

This invention relates to methods and devices for sanitary disposal of organic waste products, and more specifically, to systems for treating aqueous human originated organic waste products containing both liquid and solid.

2. Brief Description of the Prior Art

A number of systems have previously been proposed for disposing of organic waste materials by the application of heat in various forms. Many of these incorporate an incineration type unit in a compact space for treating and sanitizing human waste in remote locations—that is, a portable toilet type structure which sterilizes and sanitizes the waste prior to disposal.

For example, in U.S. Pat. No. 3,700,565 to Cornish, et al., a portable toilet system is disclosed for disposing of human waste or sewage using a microwave unit for the purpose of sterilization and vaporization of the liquid phase of the sewage. In some forms of the invention described in the Cornish et al. patent, the thus vaporized liquid can be recondensed and recycled for flushing purposes.

In Rascov U.S. Pat. No. 3,431,563, after comminution of organic wastes containing both liquid and solids, the comminuted waste is mixed with oil and is then flushed onto a rotating screen which is mounted for rotation about a horizontally extending axis. The oil and water pass through the screen, and the solids are carried upwardly by the screen into proximity to heating elements where they are dried or burned, and the ashes are then dropped off the screen into a collection drawer.

High oscillatory frequency electrical energy is utilized in accordance with the procedure described in Martin U.S. Pat. No. 2,700,775 for generating sufficient heat in collected solid material in a toilet to incinerate this material. According to the Martin patent, both solid and liquid wastes are simultaneously incinerated. The ash produced by the incineration in dropped into an ash collection tray until a sufficient accumulation is present to warrant removal and dumping. The incineration of the material is aided and substantially speeded by the presence of ozone.

In U.S. Pat. No. 2,676,058 to Gray, microwave energy is used for sterilization purposes by supporting various articles to be treated on a rotating turntable. The articles are carried under the microwave source as the turntable turns through a certain sector, and sterilization is thereby affected. The Gray disclosure is not, however, concerned with the treatment of sewage.

Other patents dealing with organic waste disposition include McKenzie U.S. Pat. No. 3,962,044; Boucher U.S. Pat. No. 3,926,566; Blankenship U.S. Pat. No. 3,921,227; Turner U.S. Pat. No. 3,882,552; West U.S. Pat. No. 3,816,857; Riedel et al. U.S. Pat. No. 3,755,827; Swallert U.S. Pat. No. 3,589,276; and Graef et al. U.S. Pat. No. 3,768,386.

In U.S. Pat. No. 3,608,273, the patentee suggests that microwave energy cannot be used effectively or efficiently for the regeneration of activated carbon from organic waste materials. The patentee implies that high frequency dielectric heating can only be used for non-conductive absorbents, which, by the patentee's definition, excludes activated carbon.

BRIEF DESCRIPTION OF THE PRESENT INVENTION

The present invention provides a compact system which can be used for entirely and effectively disposing of organic waste materials in a safe and sanitary fashion, and in doing so, functions to manufacture an important expendable part of the waste disposal apparatus from a portion of the waste material treated. This is accomplished through the use of microwave energy.

Broadly described, the method of the invention comprises the steps of initially placing the aqueous organic waste material upon a bed of solid particles of activated carbon, and preferably upon a rigid perforated member made of a refractory material or the like and overlying the bed of solid particles of activated carbon. The perforated member and/or bed is then moved to bring the waste thereon into a zone in which the waste is irradiated by microwaves to sterilize and sanitize both the solid waste and liquid percolating through the bed of solid activated carbon particles. After irradiation of the waste by microwaves, the perforated member is further moved to transfer the solid waste on the perforated member to a recovery zone where the solid particles are removed from the perforated member and conveyed to a pyrolysis/incineration zone. In the pyrolysis/incineration zone, the solid particles can either be pyrolyzed to ash and innocuous gases, or converted to activated carbon particles which can be utilized in the periodic regeneration of the bed of solid particles of activated carbon.

During the movement of the perforated member, the water from the aqueous organic waste is percolated through the bed of activated carbon and solid organic matter is filtered therefrom. The liquid is thus purified, and is sterilized by exposure to microwave energy as the perforated member moves through the zone in which microwave energy impinges on the perforated member and the activated carbon bed therebeneath.

The apparatus of the invention includes a bed of solid activated carbon particles, means for supporting an aqueous solid waste over the bed of solid activated carbon particles to permit liquid to pass through this supporting means into the bed of solid particles and percolate downwardly through the activated carbon particles, and means for concurrently moving both the supporting member and the bed of activated carbon particles between several positions of treatment of the waste material. Means is disposed over the supporting means at one of these treatment positions or locations for depositing the waste material on the supporting means. At another position or location of treatment, means is disposed over the disc for directing microwaves against the disc and against the waste material carried thereon. The second position or location, in which the microwave treatment occurs, is spaced from said first location in the direction of movement of the supporting means. A source of microwaves is then positioned over the supporting means at a third treatment position or location for directing microwaves against the disc. Finally, at yet another or fourth location or treatment position, means is provided over the supporting member for removing solid sterilized particles from the upper side of the supporting member. Water which has percolated down through the activated carbon particles, and has been filtered in the course of such percolating movement and also exposed to the sterilizing effect of the microwaves, is collected in a collecting means which is positioned beneath the bed of activated carbon particles. The solid treated particles which are removed from the upper surface of the supporting means are passed through a suitable conveyance means to a pyrolysis/incineration chamber in which are located microwave energy sources and/or means for pyrolyzing the solid particles stored therein. In a preferred embodiment of the apparatus, optional modes of operation exist at this point, with the microwave energy source being utilizable to convert the stored sterilized solid particles to activated carbon useful for replacing spent carbon in the filter bed or, in the alternative, operation in a destruction mode in which the stored sterilized particles are highly heated to convert them to a small body of ash and innocuous gases.

In a preferred embodiment of the invention, the apparatus described is assembled within a housing and used in association with a toilet for safely, quickly and sterilely disposing of human excrement.

An important object of the present invention is to provide a compact system and relatively simple method which can be used for entirely and effectively disposing of an aqueous organic waste. The apparatus is capable of being fabricated in a self-contained, non-contaminating system composed of a recepticle for the waste, a liquid handling system, a solids handling system, a sterilization device and an activated carbon regeneration system.

Further, an additional object of the invention is to provide a simple apparatus for safely and effectively disposing of an aqueous organic waste which uses a shielded microwave source for effecting waste sterilization, and a similar source for regenerating activated carbon used in a filter bed for filtering the liquid portion of the waste at the same time that the liquid portion of the waste is being subjected to the sterilizing effect of microwaves.

An additional object of the invention is to provide a liquid organic waste disposal system which is characterized in having a rapid start-up and a rapid cool-down cycle.

A further object of the invention is to provide an organic waste disposal system which is very energy efficient.

Another object of the invention is to provide an organic waste-handling system for disposing of organic waste without excessive contamination, and with accompanying self-cleaning of the apparatus as it is in operation.

Additional objects and advantages of the present invention will become apparent as the following detailed description of a preferred embodiment of the invention is read in conjunction with the accompanying drawings which illustrate such preferred embodiments.

GENERAL DESCRIPTION OF THE DRAWINGS

DETAILED DESCRIPTION OF A PREFERRED EMBODIMENT OF THE INVENTION

Figure 1:
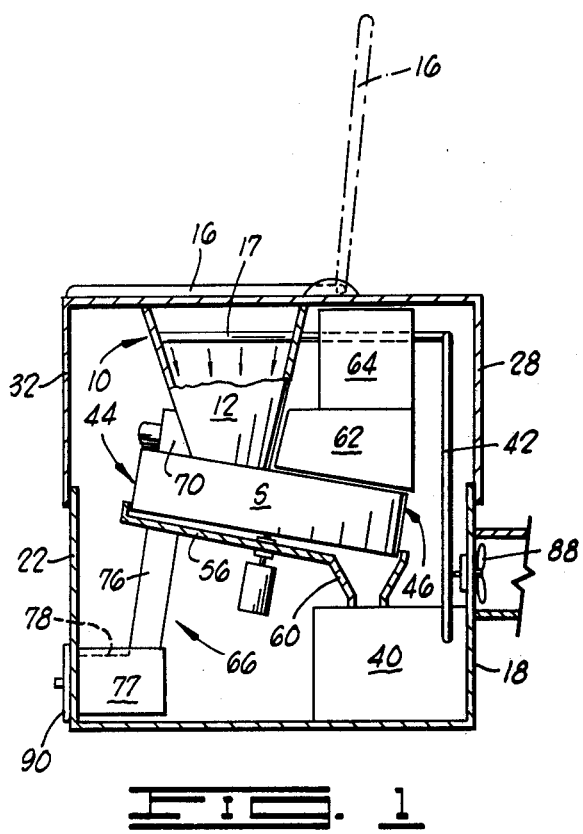
FIG. 1 is a view from the side, partly in elevation and partly in section, of one embodiment of an apparatus for carrying out the method for disposal of organic wastes in accordance with the present invention.
Figure 2:
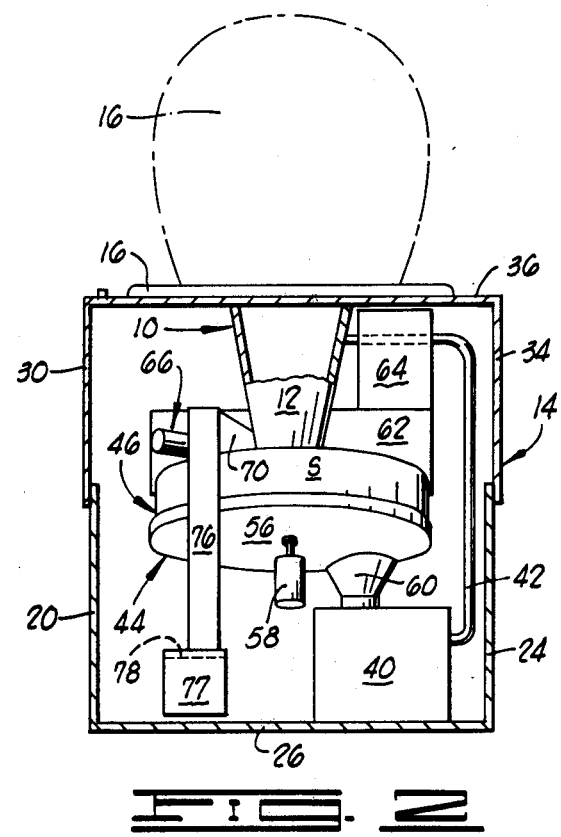
FIG. 2 is an elevation view of the apparatus illustrated in FIG. 1, turned 90° from the view of the apparatus appearing in FIG. 1, and illustrating a housing of the apparatus in section.
Figure 3:
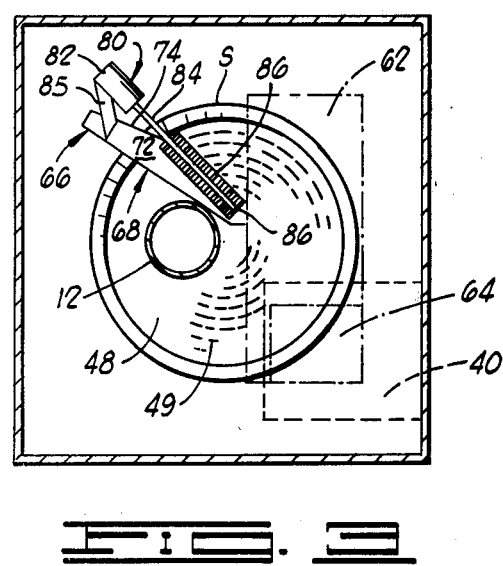
FIG. 3 is a top plan view of the apparatus shown in FIGS. 1 and 2 with a portion of the housing removed and parts broken away to better illustrate underlying portions of the apparatus.

Referring initially to FIG. 1 of the drawings, a waste receptacle for receiving organic wastes consisting of a mixture of solid and liquid is illustrated, and in the embodiment of the invention here under discussion, is a toilet assembly 10. The toilet assembly 10 includes a bowl 12 which communicates with an opening in the top side of a confining housing 14. The toilet assembly further includes a conventional seat 16 which is pivotally mounted on the housing 14 to extend across the opening which communicates with the bowl 12. The seat 16 is shown in its raised position by the dashed lines in FIGS. 1 and 2. Spaced below the open top of the bowl 12 and extending therearound is a flush ring 17.

The housing 14 is preferably formed as a bottom section, which includes side walls 18, 20, 22 and 24 and a bottom wall 26, and a top section, which includes side walls 28, 30, 32 and 34 and a top wall 36. The top section of the housing 14 is easily removable from the bottom section thereof to permit access to be had to certain components of the system as hereinafter described. In removing the top section of the housing 14, the toilet assembly 10 is removed with this section of the housing. For the purpose of flushing the toilet assembly 10, a flush tank 40 is provided in the lower portion of the housing 14 and supplies flush water via a conduit 42 to the flush ring 17 in the upper portion of the bowl 12 in conventional fashion.

Figure 5:
FIG. 5 is a sectional view taken along line 5—5 of FIG. 4.
Figure 5:
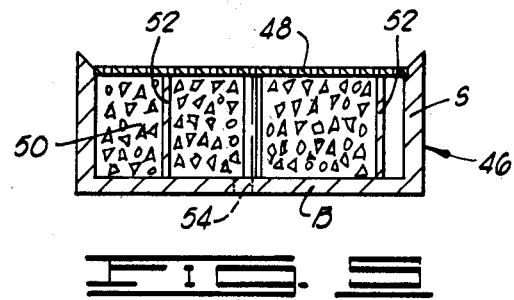

In the embodiment of the invention here under consideration, human waste, which may typically consist of urine and feces, enters the system via the toilet bowl 12 and falls onto a revolving perforated disc 44 assembly which is inclined with respect to the horizontal so that it slopes downwardly from the point of deposition of the organic waste on the upper surface thereof. The lower end of the bowl 12 terminates at a location spaced above the disc 44. The perforated disc assembly 44 includes a disc-shaped housing 46 which supports at its upper side, a removable perforated disc 48 having perforations 49 therein. The disc-shaped housing 46 includes a generally cylindrical side wall S and a bottom wall B as shown in FIG. 5.

Figure 4:
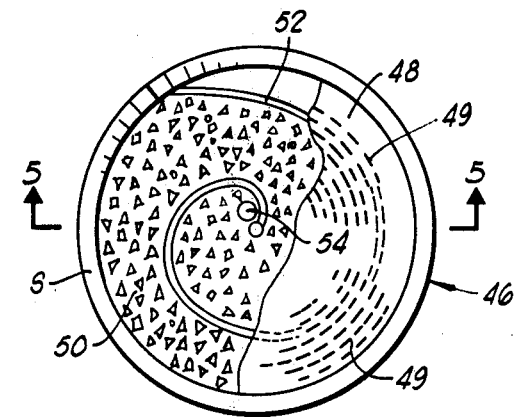
FIG. 4 is a plan view of the rotary perforated disc and activated carbon bed surrounding housing, all forming portions of the present invention, and illustrating a part of the perforated disc broken away to show a spiral guide wall or partition disposed in the bed of activated carbon.

Positioned beneath the perforated disc 48 within the disc-shaped housing 46 is a bed of solid activated carbon particles 50. The housing 46 also contains a spiral-shaped partition wall 52. It will be noted in referring to FIG. 4 that the spiral partition wall 52 extends from a point quite near to the center of the housing 46 and spirals outwardly to a position adjacent the peripheral wall S thereof. At its center terminus, the spiral partition wall 52 terminates near an opening or perforation 54 in the bottom of the housing 46 which functions to permit purified liquid to pass through the housing 46 into an underlying drain pan 56. The manner in which the spiral partition wall 52 functions in directing liquid passed through the charcoal bed 50 inwardly to the discharge opening 54 will be hereinafter explained in greater detail.

For the purpose of driving the housing 46, activated carbon bed 50 and perforated disc 48 in rotation, a motor 58 is mounted in any suitable way beneath the housing 46, and includes a drive shaft which extends through a watertight journal or bearing in the drain pan 56 to a point of connection to the underside or bottom B of the housing 46. The drain pan 56 carries at the lower side thereof, a downwardly extending funnel 60 which functions to convey liquid from the drain pan 56 into the flush tank 40 to replace and store flush water.

Disposed within one side of the upper portion of the housing 14 is a microwave chamber 62. The microwave chamber 62 which is positioned below a suitable source 64 of microwaves directs a microwave radiation downwardly so that the microwaves inpinge upon the upper side of the perforated disc 48 as the disc is rotated. The microwave chamber 62 is terminated in close proximity to the upper side of the disc-shaped housing 46 of the disc assembly 44 so as to shield the microwaves, and assure that they are directed solely against the upper surface of the perforated disc 48 and the organic waste material carried thereon.

Positioned within the housing 14 and generally to one side of the disc assembly 44 is a pyrolysis/incineration subassembly 66. The pyrolysis/incineration subassembly 66 includes a generally horizontally extending solids collector scoop 68 which projects out over the perforated disc 48 in close proximity to the upper surface thereof, and at a location preferably immediately upstream from the toilet bowl 12. The solids collector scoop 68 includes a vertically extending solids arresting wall 70, a top wall 72 and a short forward wall 74. The collector scoop 68 is connected to a down chute 76 which receives solids from the collector scoop and conveys them by gravity to an irradiation and storage chamber 77. The irradiation and storage chamber 77 has positioned in the upper portion thereof one or more microwave generating devices 78. The irradiation and storage chamber 77 also communicates through an opening in a side wall 22 of the lower portion of the housing 14 which is closed during operation of the device by a closure hatch 90.

For the purpose of forcing particulate solids into and through the collector scoop 68 of the pyrolysis/incineration subassembly 66, a rotary brush subassembly 80 is provided. The rotary brush subassembly includes a motor 82 secured to a supporting bracket 85 on the collector scoop 68, and an elongated output shaft 84 from the motor which carries a cylindrical brush 86. The brush 86 is positioned immediately over the upper surface of the perforated disc 48 so that the lower peripheral portion of the brush contacts the surface of the disc as the brush revolves.

It will be noted that the shaft 84 and the axis of rotation of the brush 86 extend substantially radially inwardly along the upper side of the disc assembly 44, and that the perforations 49 are oriented in substantially concentric rings around the center of rotation of the perforated disc so that they pass under the brush in a direction substantially normal to the axis of rotation of the brush. It will also be noted that the solids arresting wall 70 of the solids collecting scoop 68 extends along a minor chord of the perforated disc 48, and at an acute angle to the axis of rotation of the brush 86. The brush 86 projects from the radially inner end of the short forward wall 74 of the solids collecting scoop 68 inwardly to a point of near convergence with the inner end of the solids arresting wall 70.

In one side of the lower portion of the housing 14, a vent fan 88 is mounted and functions to pull gases developed during one phase of the process of the invention through an opening in the housing wall at this point, and vent these gases to the outside of the apparatus.

OPERATION

For purposes of discussion, and to demonstrate the operation of a presently preferred embodiment of the present invention, reference will be made to the drawings which show the apparatus of the invention as it is arranged in a compact form for utilization as a commode or toilet system for disposing of human waste. The somewhat conventional toilet assembly 10 provided as a part of the apparatus of the invention is located within the confining housing 14 which, as previously indicated, is made in two parts, including a top side and a lower side. The toilet seat 16 is hinged to the top of the upper part of the confining housing 14 and the toilet bowl 12 depends downwardly therefrom and terminates over the upper surface of the perforated disc 48. The perforated disc 48 can be constructed of various materials but is preferably a refractory material of some type. The disc 48 is supported over the bed of activated carbon particles 50 which are confined within the housing 46, and the housing 46, carbon bed 50 and perforated plate 48 are all rotated simultaneously about a central axis by means of the motor 58.

As the organic waste, including both solid material and water, is deposited upon the upper surface of the perforated disc 48, it is moved from under the toilet bowl 12 as the disc rotates. Concurrently, the liquid portion of the waste begins to pass through the perforations in the disc 48 and to enter the bed of activated carbon particles 50. Due to the inclination of the disc 48 and the bed of carbon particles 50, and coupled with the channeling action afforded by the spiral-shaped partition wall 52, the liquid within the bed 50, which initially enters the bed near the periphery of the outer side thereof, gravitates and is moved toward the center of the bed. It thus traverses an extensive course through a somewhat spiral path as it moves from the point of deposition upon the disc 48 through the bed 50 to a location near the center of the bed.

As the housing 56 is carrying the disc 48 and the activated carbon particles bed continues to rotate, the location on the disc 48 occupied by the solid organic waste is caused to pass beneath the microwave chamber 62. At this time, both the solid material on the upper surface of perforated disc 48 and the liquid within the bed 50 of activated carbon particles are subjected to microwave irradiation and undergo sterilization and sanitation by the effect of the microwaves. The microwaves originate at the source 64 at the top of the chamber 62, and the chamber functions to shield the microwave energy source from all locations outside the chamber.

As the liquid percolates downwardly through the activated carbon particles, and is caused to undergo an extended spiralling path toward the center of the housing 46, the retention time within the bed of particles is such that over 90% of the organic material in the liquid is absorbed upon the activated carbon.

After the liquid has completed the course of percolation from the lower surface of the perforated disc 48 to the bottom of the housing 46 and, in undergoing this course has passed through the microwave chamber 62, the liquid is discharged from the housing 46 as a low organic, sterilized aqueous stream. Discharge occurs onto the pan 56 from which the water then flows by gravity into the funnel 60 and ultimately into the flush tank 40. The water from the flush tank 40 can be used in whole or in part for flushing the toilet previously described, or it can be discharged.

The solid material deposited on the upper surface of the perforated disc 48, in being exposed to microwave energy as it passes through the microwave chamber 62, is stabilized, sterilized and substantially reduced in volume. As the disc 48, housing 46 and bed of activated carbon particles 50 continue to rotate, the stabilized solid residue is carried upwardly to the point where the solids on the surface of the disc are contacted by the rotating cylindrical brush 86 forming a part of the rotary brush subassembly 80. The brush 86, which operates at a sufficiently high speed of rotation to sweep across the upper surface of the perforated disc substantially faster than this surface is moving in angular movement, brushes the solid carbon particles into the collector scoop 68 of the pyrolysis/incineration subassembly 66. This motion, coupled with the continued movement of the perforated disc 48 causes these particles to stack up within the collector scoop 68, and to move along the vertically extending solids arresting wall 70 to a point where the collected solids can pass through the down chute 76 into the irradiation and storage chamber 77. It will be noted that the pyrolysis/incineration subassembly 66, which includes the collector scoop 68, chute 76 and irradiation and storage chamber 77, is positioned at a location which is just upstream from the lower end of the toilet bowl 12, or stated differently, is positioned over the surface of the disc at a location such that a point on the surface of the disc which passes by this subassembly arrives subsequently in time at the point of deposition of new or fresh organic waste on the upper surface of the disk from the toilet.

It will be understood, of course, that as the disc and the underlying bed of solid activated carbon particles 50 continue to be rotated, the particles of organic matter entrapped in the bed of carbon particles as a result of filtration of the liquid therethrough continue to be intermittently irradiated by microwave energy, and by such continued irradiation, are themselves predominantly converted to an activated state, and function as an integral part of the bed of activated carbon particles.

The solid material which is passed into the irradiation and storage chamber 77 of the pyrolysis/incineration subassembly 66 is periodically subjected to thermal energy as a result of the inclusion of an electrical resistance heater, infrared lamps or a microwave energy source, such as the microwave generating device 78. Eventually, through the accumulation of certain non-convertible materials (non-convertible, that is, to activated carbon) within the bed of activated carbon particles 50, all or portions of this bed will become deactivated and exhausted, and will require replacement. It is then a simple matter to replace spent carbon particles within the bed 50 by converting a portion of the accumulated solid organic matter in the irradiation and storage chamber 77 to activated carbon by subjecting it to appropriate heating, preferably with microwaves. In order to accomplish such replacement, the disc 48 can be removed from the housing 46 to provide access to the bed 50 of activated carbon particles.

As the apparatus of the invention is preferably constructed, an alternative mode of treatment of the solid material accumulated and stored within the irradiation and storage chamber 77 can be carried out. This entails subjecting this material to very high temperature by placing the apparatus in a destruction mode in which pyrolysis is caused to occur at this location. At the same time, high temperature can be caused to occur within the flush tank 40, if desired, to vaporize the liquid waste products there stored. By this means, the solid particles accumulated in the irradiation and storage chamber are converted to very slight or negligible ash residue, and the vapors developed from the liquid in the flush tank 40 can be vented to the outside of the lower portion of the housing 14 by means of actuation of the vent fan 88 located in one side of the housing at this location.

It will be perceived from the foregoing discussion of the method and apparatus of the invention, and the manner in which both are used, that the invention provides a compact system by which human waste, particularly, can be quickly and easily disposed of in a safe and sanitary manner. The invention is, however, also useful is disposing of a great many other types of organic wastes. The compact apparatus is particularly useful for the disposal of human wastes or other like disposable waste products originated at remote, humanly occupied shelters, such as boats or moving vehicles. Very small heat exchange zones are needed in the system in order to effect a very substantial, almost complete reduction of the waste, so that there is very little residual matter requiring ultimate disposition. No external or additional supply of fuel or oxidant, other than an energy source for development of the microwaves is required.

Although a preferred embodiment of the invention has been herein described in order to illustrate the principles underlying the invention, it will be understood that various changes and innovations can be effected in the described structure and method without departure from the basic principles of the invention. All such changes and innovations are therefore deemed to be circumscribed by the spirit and scope of the invention except as the same may be necessarily limited by the appended claims or reasonable equivalents thereof.

What is claimed is:

1. A method for treating aqueous organic waste comprising:
   depositing the waste on a porous bed of activated carbon;
   concurrently irradiating with microwaves, the solid waste on the bed and the liquid waste filtering through the bed and solid particles filtered from the liquid waste within the bed, to sterilize all of said waste materials;
   removing the sterilized solid waste from the bed and storing it;
   heating the stored, sterilized solid waste to convert it to activated carbon; and
   replacing spent depleted carbon particles from said bed with activated carbon particles derived from the conversion of stored, sterilized solid waste.

2. A method of treating aqueous organic waste as defined in claim 1 and further characterized as including the steps of:
   collecting sterilized water from the bed of activated carbon after the sterilized water has filtered therethrough; and
   using a portion of said sterilized water to deposit the waste on said porous bed of activated carbon.

3. A method of treating aqueous organic waste as defined in claim 1 wherein said heating is effected by directing microwaves against said stored, sterilized solid waste.

4. A method of treating aqueous organic waste as defined in claim 1 wherein said porous bed of activated carbon is rotated to move solid waste at one location thereon under a source of microwaves to effect said irradiation, and is then further rotated to move said sterilized solid waste on the bed to a location at which said sterilized solid waste is removed from the bed.

5. A method for treating aqueous organic waste as defined in claim 4 wherein said aqueous organic waste is deposited on said porous bed at a location between the location where said microwave irradiation occurs, and the location where said sterilized solid waste is removed from the bed.

6. A method for treating aqueous organic waste as defined in claim 1 wherein said solid particles filtered from the liquid are irradiated by microwaves sufficiently to convert a major portion of said filtered solid particles to activated carbon.

7. A method for treating aqueous organic waste as defined in claim 2 wherein said porous bed of activated carbon is rotated to move solid waste at one location thereon under a source of microwaves to effect irradiation, and is then further rotated to move said sterilized solid waste on the bed to a location at which said sterilized solid waste is removed from the bed.

8. A method for treating aqueous organic waste as defined in claim 7 wherein said heating is effected by directing microwaves against said stored, sterilized solid waste.

9. A method for treating aqueous organic waste as defined in claim 8 wherein said aqueous organic waste is deposited on said porous bed at a location between the location where said microwave irradiation occurs and the location where said sterilized solid waste is removed from the bed.

10. A method for treating aqueous organic waste as defined in claim 9 wherein said solid particles filtered from the liquid are irradiated by microwaves sufficiently to convert a major portion of said filtered solid particles to activated carbon.

11. A method of disposing of aqueous organic excrement comprising:
flushing the aqueous excrement onto a rotating porous disk at one location on the disk;
positioning a filter bed of activated carbon particles under the porous disk;
rotating the disk and filter bed to bring the portion of the waste retained on the surface thereof beneath a source of microwave energy;
irradiating the waste retained on the surface of the disk with microwave energy to sterilize said retained waste;
rotating the porous disk to a position in which said sterilized retained waste is remote from said source of microwave energy;
removing the sterilized retained waste from the disk;
collecting water filtered through the bed of activated carbon; and
using at least a portion of said collected water for accomplishing said flushing.

12. A method as defined in claim 11 and further characterized as including the step of converting at least a portion of said removed sterilized retained waste to activated carbon.

13. A method as defined in claim 11 and further characterized as including the step of pyrolyzing said removed stabilized retained waste to convert it to gases and an ash residue.

14. The method defined in claim 11 and further characterized as including the step of irradiating with microwaves, solid particles filtered from said water and located within said carbon particles.

15. The method defined in claim 14 and further characterized as including the step of converting at least a portion of said removed sterilized retained waste to activated carbon.

16. Apparatus for treating an aqueous organic waste material comprising:
a perforated disk having an upper surface and a lower surface;
a bed of solid activated carbon particles positioned under the disk below the lower surface for receiving a liquid passing through the perforations in the disk and filtering said received liquid by gravity flow through said activated carbon particles;
means for concurrently moving the disk and bed of activated carbon particles positioned beneath the lower surface of the disk;
means disposed over said disk at a first location for depositing a mixture of solid and liquid waste material on the upper surface of the disk on the opposite side of the disk from the bed of activated carbon particles;
means disposed over said disk at a second location spaced from said first location for directing microwaves against said disk and against solid waste material carried on the disk;
means disposed over said perforated disk on the opposite side thereof from said bed of activated carbon particles and at a third location spaced from said first and second locations for recovering solid particles from the upper side of said disk after said solid particles have been produced by microwave irradiation of said solid waste material; and
means for collecting water after gravitation thereof through the perforations in said disk and then through said bed of solid activated carbon particles.

17. The apparatus defined in claim 16 and further characterized as including means for converting solid particles removed from said disk to activated carbon.

18. Apparatus defined in claim 16 and further characterized as including means for conveying water from said water collecting means to said depositing means to provide a flushing action in aid of said deposition.

19. Apparatus as defined in claim 16 wherein said microwave directing means comprises:
a source of microwaves; and
shield means for shielding the microwaves from said third location.

20. Apparatus as defined in claim 16 wherein said depositing means comprises a flush toilet.

21. Apparatus as defined in claim 16 wherein said means for concurrently moving the disk and bed comprises a motor drivingly connected to said disk and bed for driving said disk and bed in rotation.

22. Apparatus as defined in claim 16 wherein said apparatus is further characterized as including:
a housing surrounding said disk, bed, microwave directing means, removing means and collecting means; and an air circulating device for venting the housing and removing gases therefrom.

23. Apparatus for treating an aqueous organic waste material comprising:
- a perforated disk having an upper surface and a lower surface;
- a bed of solid activated carbon particles positioned under the disk;
- means for concurrently moving the disk and bed of activated carbon particles;
- means disposed over said disk at a first location for depositing waste material on the disk;
- means disposed over said disk at a second location spaced from said first location for directing microwaves against said disk;
- means disposed over said perforated disk at a third loation for recovering solid particles from the upper side of said disk;
- means for collecting water after gravitation thereof through said bed of solid activated carbon particles;
- means for conveying water from said water collecting means to said depositing means to provide a flushing action in aid of said deposition;
- a housing surrounding said disk, bed, microwave directing means, removing means and collecting means; and
- an air circulating device for venting the housing and removing gases therefrom.

* * * * *